United States Patent [19]

Weber

[11] Patent Number: 5,443,545
[45] Date of Patent: Aug. 22, 1995

[54] MULTIPURPOSE PLASTIC BUILDING COMPONENT AND METHOD FOR LAYING OUT SUCH COMPONENTS

[76] Inventor: Wolfgang Weber, Arzloherweg 5, D-8569 Förrenbach, Germany

[21] Appl. No.: 82,881

[22] Filed: Jun. 25, 1993

[30] Foreign Application Priority Data

Jun. 25, 1992 [DE] Germany .................. 9208359 U

[51] Int. Cl.⁶ .............................................. E04H 12/00
[52] U.S. Cl. ................................ 52/653.1; 52/664; 47/85
[58] Field of Search .............. 52/653.1, 655.1, 656.1, 52/656.9, 664, 665, 668, 177, 180, 581; 47/66 S, 1 F; 404/36; 405/15

[56] References Cited

U.S. PATENT DOCUMENTS

| | | | |
|---|---|---|---|
| 2,770,336 | 11/1956 | Vevirit et al. | 52/665 X |
| 2,970,676 | 2/1961 | Maciunas | 52/653.1 X |
| 3,503,839 | 3/1970 | Breitwieser et al. | 52/664 X |
| 4,118,892 | 10/1978 | Nakamura | 47/66 S |
| 4,584,221 | 4/1986 | Kung | 52/177 X |
| 4,665,674 | 5/1987 | Brugman | 52/665 X |
| 4,758,111 | 7/1988 | Vitta | 52/653.1 |
| 4,909,660 | 3/1990 | Ferns | 52/664 X |

Primary Examiner—Carl D. Friedman
Assistant Examiner—Creighton Smith
Attorney, Agent, or Firm—Herbert L. Lerner; Laurence A. Greenberg

[57] ABSTRACT

A generally flat composite structure has building blocks in the form of a plurality of multipurpose plastic building components. Each of the components includes an encompassing outer frame having a lateral surface and an interior. At least one coupling device is disposed at the lateral surface for joining two adjacent building components. Crosswise members and lengthwise members divide the interior of the outer frame into a grid of individual openings. The outer frame and the crosswise and lengthwise members are formed of plastic waste having been previously comminuted, then melted down and then injected or cast into a suitable mold. A method for laying out the components includes seeding or grassing down the components individually or in the composite structure before laying out the components, and then laying out the components in a seeded or grassed down (vegetated) state.

28 Claims, 9 Drawing Sheets

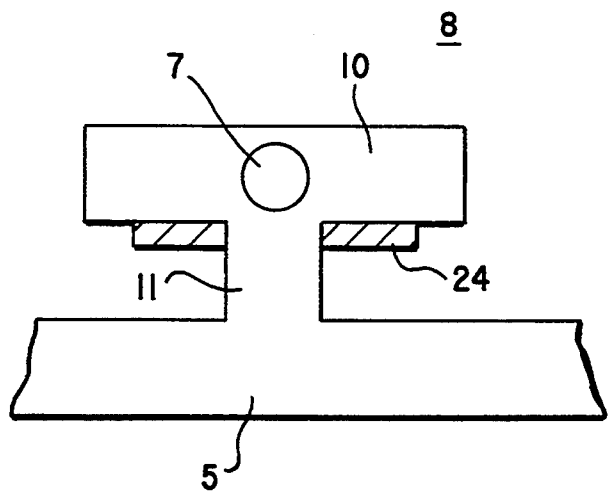
FIG.8
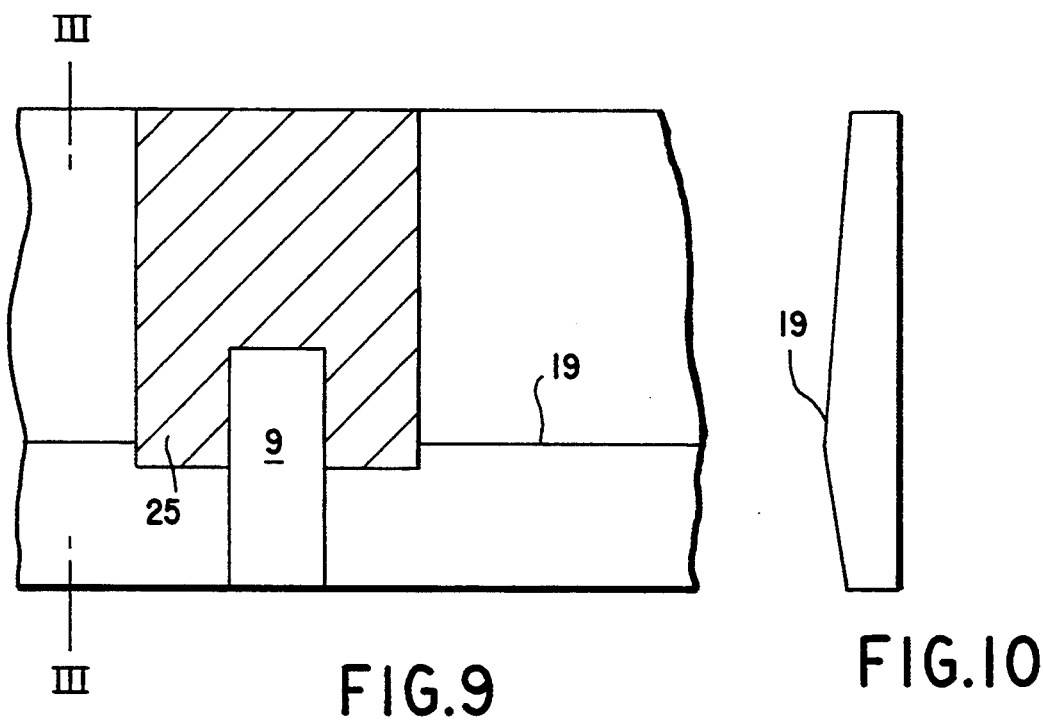
FIG.9
FIG.10

MULTIPURPOSE PLASTIC BUILDING COMPONENT AND METHOD FOR LAYING OUT SUCH COMPONENTS

The invention relates to a multipurpose plastic building component, as a building block of a generally flat composite structure including a plurality of components, and a method for laying out such components.

It is accordingly an object of the invention to provide a multipurpose plastic building component and a method for laying out such components, which overcome the disadvantages of the heretofore-known devices and methods of this general type and which can be used for different purposes, thereby opening up a broad field of application. The construction of the component should be such that ground-down and melted-down plastic waste, optionally in combination with additional ingredients, can simply be injected or poured. Accordingly, the component should make an active contribution to the disposal of plastic waste, which is regularly produced in great quantity in injection molding facilities, for instance because of incorrect dyeing. It still remains very complicated and expensive to provide complete processing of large-scale plastic waste (such as packaging material, bags, shrink-wrap, etc.) of polyethylene (low and high-pressure PE) or polypropylene, so that even today, such plastic waste regularly reaches the trash incinerator.

With the foregoing and other objects in view there is provided, in accordance with the invention, in a generally flat composite structure having building blocks in the form of a plurality of multipurpose plastic building components, each of the building components comprising an encompassing outer frame having a lateral surface and an interior; at least one coupling device disposed at the lateral surface for joining two adjacent building components; crosswise members and lengthwise members dividing the interior of the outer frame into a grid of individual openings; and the outer frame and the crosswise and lengthwise members being formed of plastic waste having been previously comminuted, then melted down and then injected or cast into a suitable mold.

The multipurpose component is thus used as a building block in a building block system as well, and is usable for the most varied purposes. The component may be used as part of a room divider, or for providing vegetation, in particular grass or the like, on the roof of a house, garage or parking lot. To that end, the component is installed on the roof, for instance, then filled with gravel and soil and planted. The crosswise and lengthwise members in combination with the outer frame lend high rigidity to the component and thus offer particularly good strength when walked on. Moreover, the component can serve equally well as part of a roadway ditch or bank planting, where washing out under plantings or washing away of plantings in the vicinity of an earthen bank or roadway ditch is effectively avoided. The component according to the invention can be produced in a simple way, because of its special shape, by injection molding techniques using plastic waste.

Since the component is usable for various purposes and as a result a high demand for the components is created, a considerable impact on disposal is assured.

In accordance with another feature of the invention, each of the building components has a main surface, and there are provided formed-on projections being distributed sheetwise in the region of the main surface at intersections of the crosswise members, the lengthwise members and the outer frame.

In accordance with a further feature of the invention, the formed-on projections are disposed at intersections of the crosswise members, the lengthwise members and the outer frame.

The formed-on projections distributed over the lower surface lend the composite structure made up of individual components particularly high slip resistance, or in other words positional stability, and moreover enable an effective runoff of rainwater.

In accordance with an added feature of the invention, in order to produce a surface that can be walked or driven upon, the lengthwise and crosswise members are flush with the frame, at least at the top which forms the surface that can be walked on.

In accordance with an additional feature of the invention, the outer frame has outer surfaces including upper and lower surfaces, the coupling device includes at least one hook part disposed at a given position on each one of the outer surfaces, and another of the outer surfaces opposite the one outer surface has a duct formed therein at the given position being open toward one of the upper and lower surfaces. This special coupling device has the advantage that during the molding process it can already be jointly molded in place, and at the same time it assures a particularly simple possibility for joining individual components with one another. All that it needed is to put two components together at their common lateral surfaces at the applicable hook part and duct.

In accordance with yet another feature of the invention, at least the lower surface of the hook part is flush with the lower surface of the outer frame. In this way, particularly good strength when walked on or driven upon is assured when the connecting points of two components are loaded.

In accordance with yet a further feature of the invention, at least one formed-on projection is provided on the lower surface of each hook part, and all such projections on a given component are intended-to be in the same plane.

In accordance with yet an added feature of the invention, the outer frames of the components have back surfaces, the at least one hook part has a crosswise extension and a lengthwise extension, the lengthwise extension joins the crosswise extension to the outer frame, and when the components are coupled together, the lengthwise extension of one of the components extends through the duct of another of the components and the crosswise extension of the one component engages the back surface of the outer frame of the other component.

In accordance with yet an additional feature of the invention, there are provided means for height locking of adjacent components that are coupled together. This is done in order to avoid shifting of individually joined-together components in height, for instance when there is a pointwise load on the composite component structure. It substantially increases the cohesion of the composite component structure.

In accordance with again another feature of the invention, as the means for height locking, the component has at least one protrusion that engages at least one recess when the components are coupled together; the protrusion can be forced out of the recess when the locking is released by means of a contrary displacement of two adjacent components; and the protrusion and recess are disposed in the region of the coupling device of the applicable component. This feature proves to be an effective solution for assuring height locking. The protrusion and recess can already be jointly molded in place in the component as integral parts of it even during the molding process.

In accordance with again a further feature of the invention, the recess is located in the region of a protuberance formed on the inside of the outer frame, so that good locking action is attained with a simple construction.

In accordance with again an added feature of the invention, the outer frame has lateral edges, and the recess extends from the outside inward from one of the lateral edges. This provides a simplification in terms of injection molding or molding techniques.

In accordance with again an additional feature of the invention, there are provided longitudinally or transversely extending recesses that assure effective cable ducting in the region of the composite component structure, if the component is intended to be used as a floor element for interior work. Such recesses can likewise easily be made by molding techniques.

In accordance with still another feature of the invention, the individual openings have crosswise protrusions disposed offset from one another with respect to the depth. As a result, the component can be used as a noise abatement component or as a sound-insulating partition.

In accordance with still a further feature of the invention, the retaining means are suitably jointly joined into at least one duct and have a duct themselves into which a ground anchor or the like can be introduced. This is done if the component is used as part of means for stabilizing a roadway ditch or planting a bank or embankment.

In accordance with still an added feature of the invention, the individual openings are provided with a covering on their top, which offers the possibility of providing individual display or advertising surfaces, if the component is used as a room divider, for instance.

In accordance with still an additional feature of the invention, there are provided spacer sleeves that can be slipped onto the formed-on projections protruding from the lower surface. This is done in order to increase the space between the lower surface of the particular component and the floor or ground surface. For instance, if the component is used as part of a dovecote flooring, then through the use of this provision the distance between the lower edge and the top of the ground can be varied, for instance in order to prevent the doves from having access to feed that has fallen on the ground.

In accordance with another feature of the invention, there is provided a connecting element being wedge-shaped as seen in a plan view and having lateral surfaces, the at least one coupling device being disposed only on the lateral surfaces of the connecting element, and the lateral surfaces of the connecting element corresponding in length to the lateral surface of the outer frame. The advantage of this feature is that by using the connecting element it becomes possible to produce angled composite surfaces, for instance for a driveway leading to a garage, or the like.

In accordance with a further feature of the invention, the connecting element has two opposed obliquely extending lateral surfaces, and the lateral surfaces correspond in length to the lateral surface of the outer frame. The advantage of this structure is that the connecting element enables effective connection of component configurations that are disposed in planes which extend obliquely relative to one another, as is the case with plantings in a roadway ditch, for instance.

In accordance with an added feature of the invention, the component has an intermediate wall extending transversely across the entire surface, the wall forming a lower hollow space and having at least one drainage opening formed therein. When the component is used as a roof planting element or as roof terrace paving, this prevents unintentional raising of the composite structure from the gravel or crushed stone in it when a load is put on it. The intermediate wall prevents the gravel from slipping between the ground and the lower surface of the applicable component and thus causing an unintended change in height, when a load is exerted.

In accordance with an additional feature of the invention, there are provided marking elements that are insertable into the individual openings of the component, for marking the top side or upper surface of the applicable component. As a result, parking lot markings or sidewalk markings can easily be made on the component. Due to its simple shape, the marking element itself can likewise be produced from the melted-down plastic material and thus also makes a contribution to disposal.

In accordance with yet another feature of the invention, the fixation of the marking element inside the opening is suitably done by simple clamping or by means of a tongue and groove connection.

In accordance with yet a further feature of the invention, the first-mentioned component has a given side length, and there are provided further components being disposed next to the first-mentioned component and having sides, at least one of the sides of the further components having half the given length, a plurality of the components being joined together into the generally flat composite structure of a given size for transport, the composite structure having a lower surface on which the further components are disposed as bottom supports, and the components defining interstices to be engaged by a forklift or the like.

In accordance with yet an added feature of the invention, there is provided at least one tightening strap passing through the openings in the components for connecting the components together in the vertical direction.

These features have the effect of ensuring that the components in the composite structure can already be intrinsically molded in the form of so-called pallets, without having to use additional wooden pallets of the usual kind. Vertically joining individual composite component structures can be astonishingly easily by passing one or more tightening straps through the openings. Both delivery and transport of the components are therefore possible without requiring additional transport aids.

In accordance with yet an additional feature of the invention, there is provided a proportion of cardboard waste in a composition of the previously comminuted and then melted-down plastic waste.

In accordance with again another feature of the invention, the component is square and has the following dimensions: total length=250-500 mm, length of one opening=50-70 mm, component depth=40-60 mm, and thickness of the crosswise members and the lengthwise members=4-6 mm.

With the objects of the invention in view, there is also provided a method for laying out the components which comprises seeding or grassing down the components individually or in the composite structure before being laid out, and only then laying out the components in the seeded or grassed down (vegetated) state.

The advantage of these steps is that, for instance, where parking lot surfaces are to be laid out, they can be provided "overnight" with vegetation (grass) and in addition can even immediately be driven upon. Moreover, the costs for a parking lot provided with grass in this way are considerably lower than with conventional grass growing. The advantage of a parking lot surface provided with grass in this way is moreover its enormously high load bearing capability, which with values of 350 to 500 metric tons per square meter considerably exceeds the legally prescribed values for fire department driveways (100 metric tons per square meter). In the final analysis, a surface provided with green grass in this way also has the advantage of giving the grassy surface increased protection in the event of intensive mechanical loading as a result of the composite component structure. The composite component structures with grass already growing in them can be kept on hand in square-meter sizes or the like for being laid out.

In accordance with a concomitant mode of the invention, there is provided a method which comprises trimming the components to local conditions, which is possible because of their material. For instance, a component can be provided with a cutout or cut-off part, in order to provide vegetation around a manhole cover or the like.

The invention thus offers a considerable disposal effect, because the plastic waste mentioned at the outset becomes fully recycleable. At the same time, by using these plastics, both high mechanical strength, acid resistance and resistance to weathering on the part of the component are assured.

Other features which are considered as characteristic for the invention are set forth in the appended claims.

Although the invention is illustrated and described herein as embodied in a multipurpose plastic building component and a method for laying out such components, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 8 is an enlarged, fragmentary, plan view of a more-detailed embodiment of a hook part;

FIG. 9 is a fragmentary, plan view of an inside of an outer frame in the region of the duct;

FIG. 10 is a side-elevational view taken along the line III—III of FIG. 9;

Figure 1:
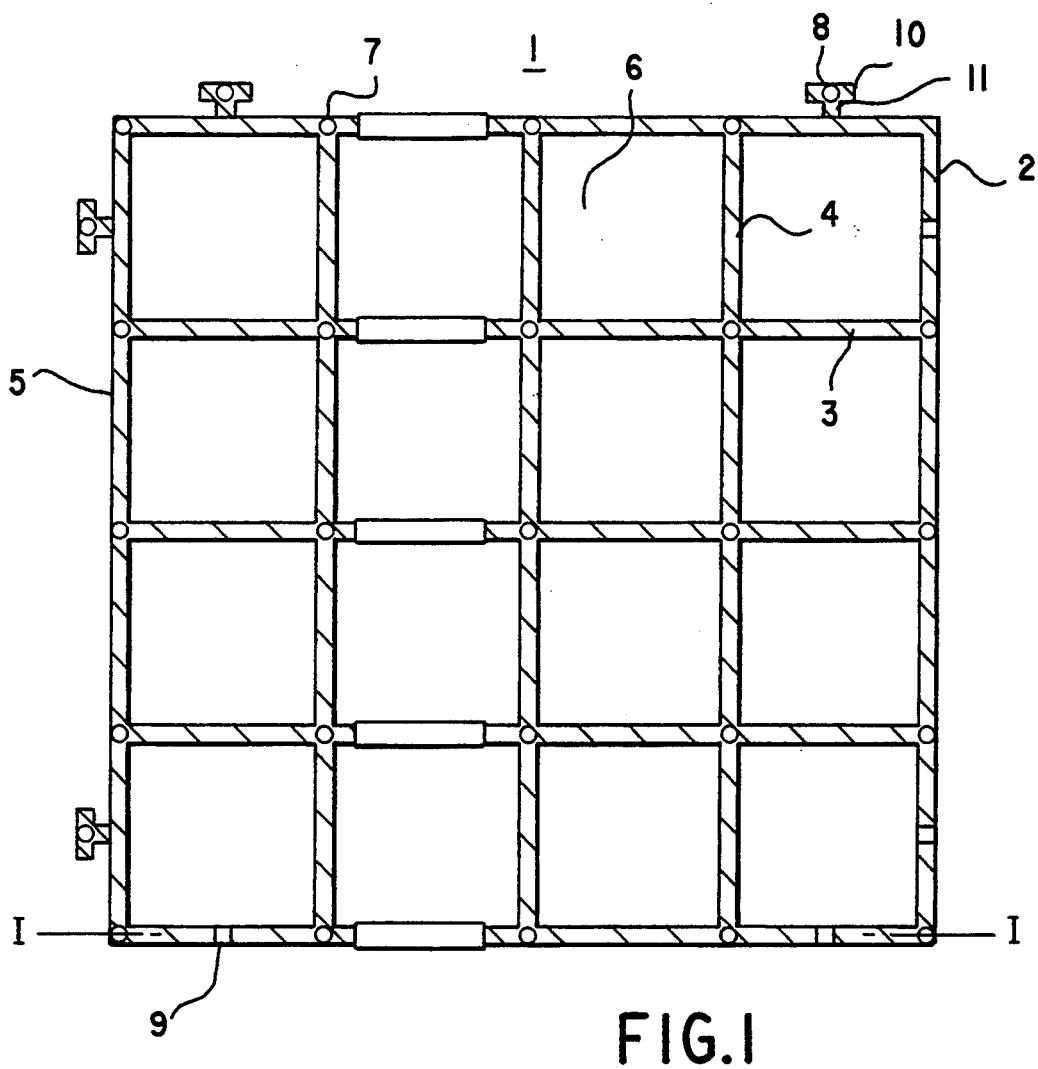
FIG. 1 is a diagrammatic, bottom-plan view of an embodiment of a component according to the invention, to be used, for instance, for planting the roof of a house.
Figure 18:
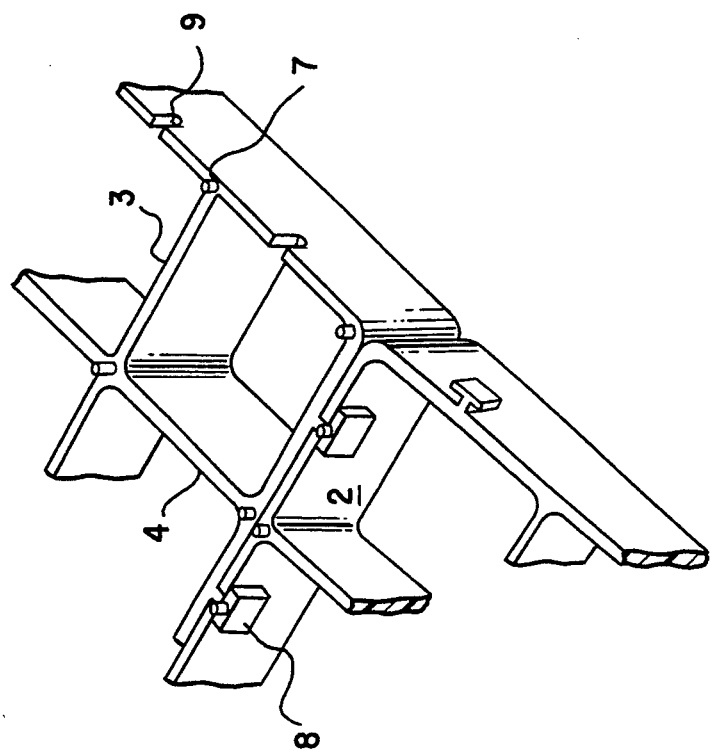
Figure 17:
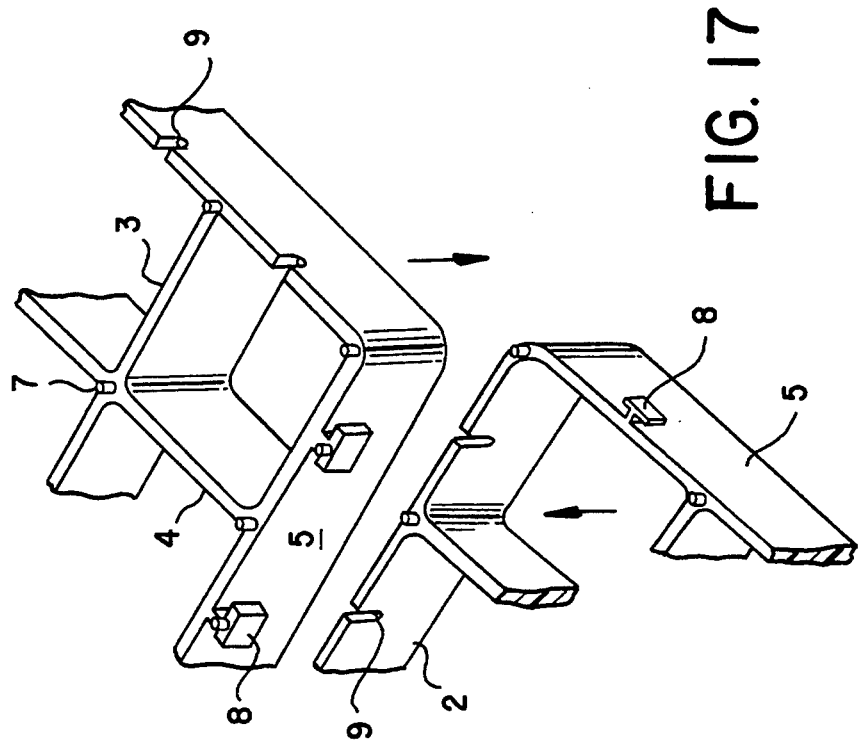

FIG. 17—A fragmentary, perspective view of two adjacent components according to FIG. 1, just before they are connected, FIG. 18—a similar view of the two components after they have been connected.

Referring now in detail to the figures of the drawing, in which identical reference numerals are used for identical characteristics in the various drawing figures, in which characteristics that appear multiple times in the various figures are identified with the applicable reference numeral only once for the sake of simplicity, and first, particularly, to FIG. 1 thereof, it is seen that reference numeral 1 identifies a building component according to the invention in its entirety. The component includes an outer frame 2, which may be square in shape. The inside of this outer frame 2 is connected with a plurality of crosswise members 3 and lengthwise members 4, which divide the component 1 into a plurality of individual cells, or in other Words openings, leadthroughs or ducts 6.

At each intersection between the outer frame 2, a crosswise member 3 and a lengthwise member 4, there is a formed-on projection, and all of these projections are disposed on the lower surface of the component 1.

Left and upper lateral surfaces 5 as seen in FIG. 1 have hook parts 8 disposed thereon, each of which has a crosswise extension 10 that is joined to the lateral surface 5 through a lengthwise extension 11.

Figure 2:
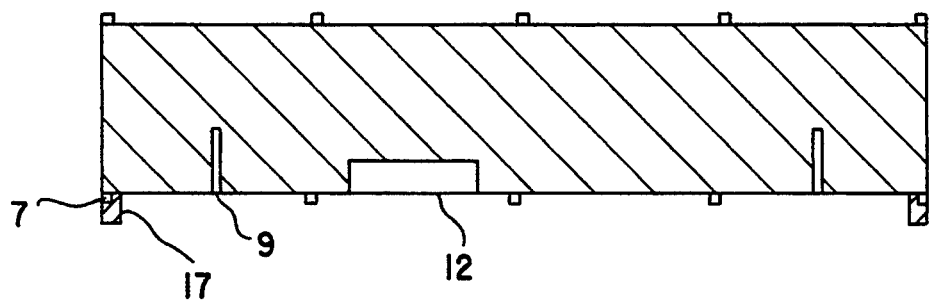
FIG. 2 is a longitudinal-sectional view taken along the line I—I of FIG. 1, with the sectional view being rotated through 180° in comparison with FIG. 1.

The hook parts 8 are likewise each provided with a formed-on projection 7 on the lower surface thereof. Ducts 9 are provided in the lateral surfaces 5 opposite the various hook parts 8 in positions that coincide with the hook parts 8. In the version of FIG. 1, the ducts are constructed in such a way as to be open toward the lower surface, as is also seen in FIG. 2. This construction assures that two components can be put together at their common lateral surfaces, at the respective hook part 8 and duct 9.

The disposition of the individual ducts is clearly shown in FIG. 2, which is a sectional view taken along the line I—I of FIG. 1.

In FIG. 2, the ducts 9 are open at the lower surface and extend inward into the lateral surface 5. Moreover, a recess 12 is provided in the lower surface, which assures the capability of extending cables and the like through it if the component is used as part of a floor topping or covering.

If the component is used as part of the floor topping or covering in a stable or barn, then suitably spacer sleeves 17 may be provided, which makes the distance between the lower surface of the component 1 and the plane of the floor itself variable. The spacer sleeves 17 can preferably be slipped onto the formed-on projections on the lower surface.

Figure 3:
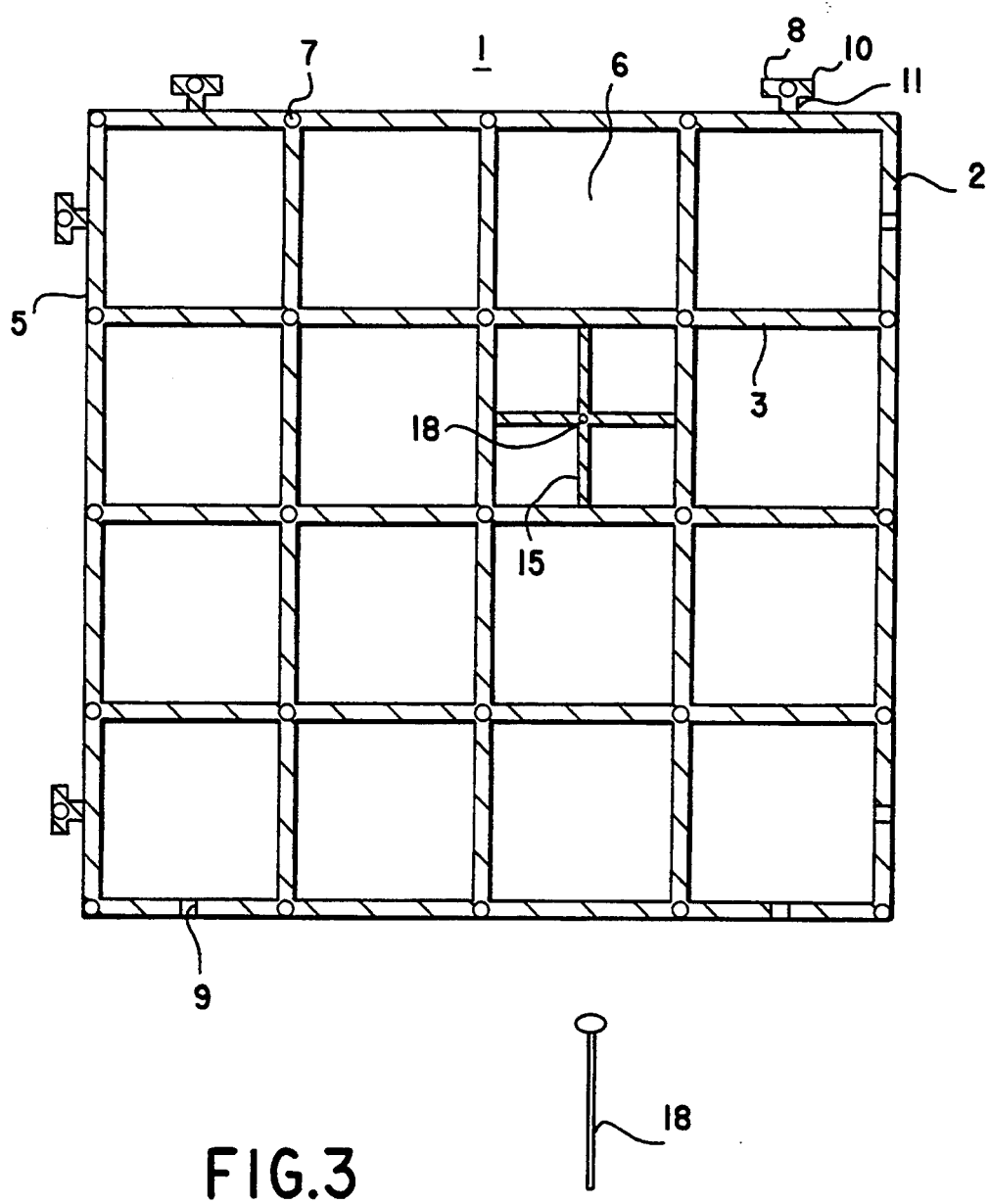
FIG. 3 is a bottom-plan view of a further embodiment of the component according to the invention, as part of means for stabilizing a bank or roadway ditch.

The view of FIG. 3 differs only in the additional characteristic of retaining means 15, which are disposed in an opening 6. The retaining means 15 have a bore formed therein through which a ground anchor or fastening pin 18 can be passed which serves to join the component 1 firmly to the ground when the component is used for stabilizing earthen banks or roadway ditches, or for stabilizing home driveways, parking lots, and so forth.

Figure 4:
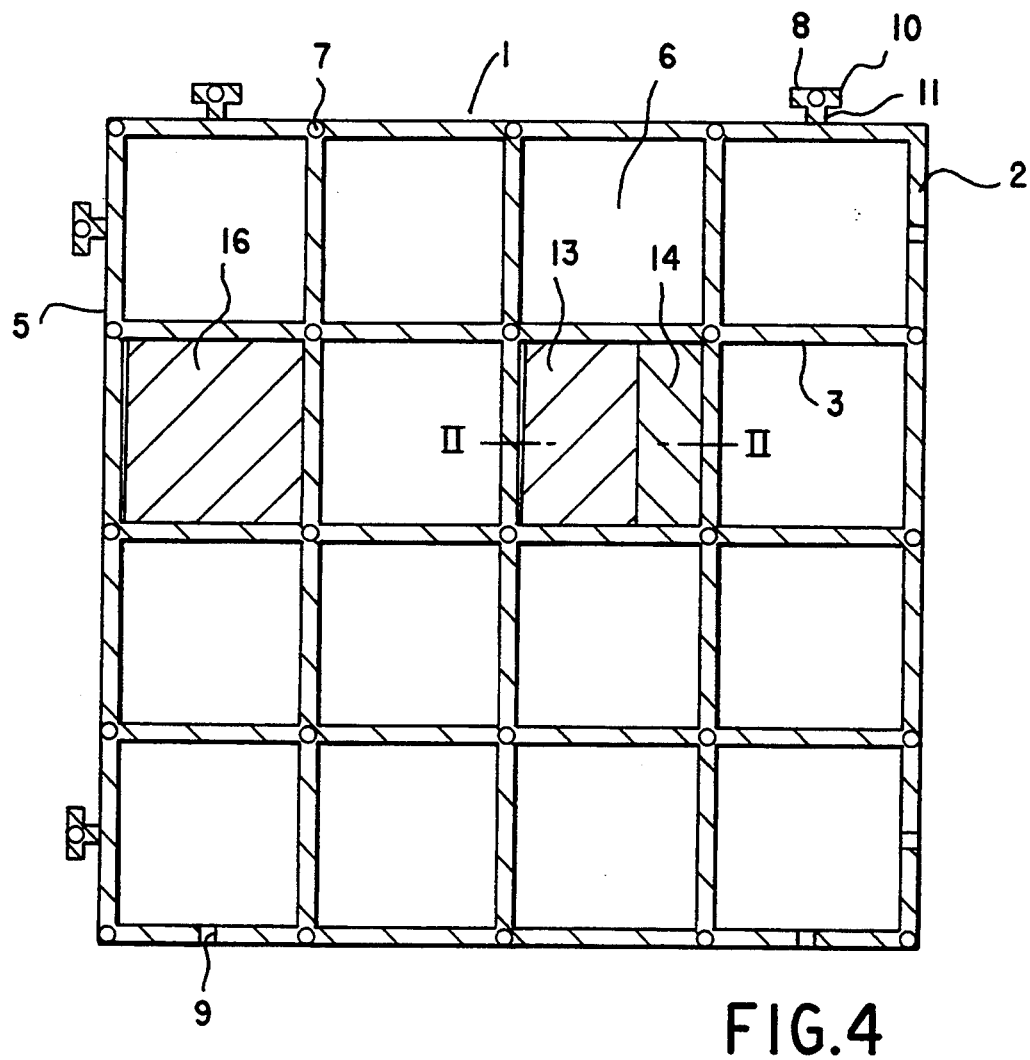
FIG. 4 is a bottom-plan view of a further embodiment of the invention, showing various possibilities for use.

According to FIG. 4, provision is made for closing off individual openings 6 with a covering 16, which is to be used or in other words which can be provided with printed-advertising or the like, when the component 1 of the invention is used as a display surface.

For the sake of simplicity, FIG. 4 shows a further modification that is independent of the above-described embodiment, in which all of the openings 6 have crosswise protrusions 13 and 14 which are disposed offset from one another with respect to their depth and which assure a sound-absorbing function. For the sake of simplicity, in FIG. 4 only one opening is shown with such crosswise protrusions 13 and 14.

Figure 5:
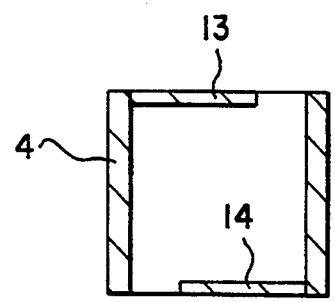
FIG. 5 is a longitudinal-sectional view taken along the line II—II of FIG. 4.

According to FIG. 5, the crosswise protrusions may be directly flush with the upper surface or lower surface of the component, or in an alternative embodiment they may also be disposed in the inner region, that is between the upper and lower edges of the component 1.

Figure 6:
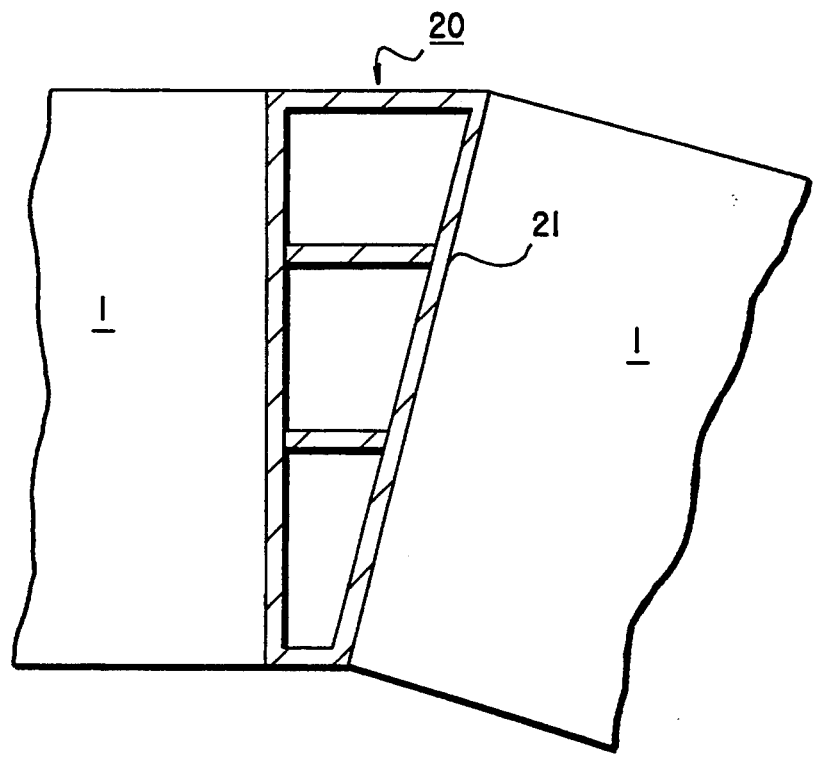
FIG. 6 is a fragmentary, highly simplified plan view of a connecting element showing an angled connection of two adjacent components.

The subject of the invention also extends to connecting elements for joining together two adjacent components 1 or 1', for instance A connecting element 20 of FIG. 6 joins two adjacent components 1 in such a way that they are disposed at a certain angle relative to one another. To that end, the connecting element 20 is wedgelike and is provided on lateral surfaces 21 thereof with a corresponding coupling device of the type which has already been described at the outset. The coupling elements are not shown in FIG. 6, for the sake of simplicity.

Figure 7:
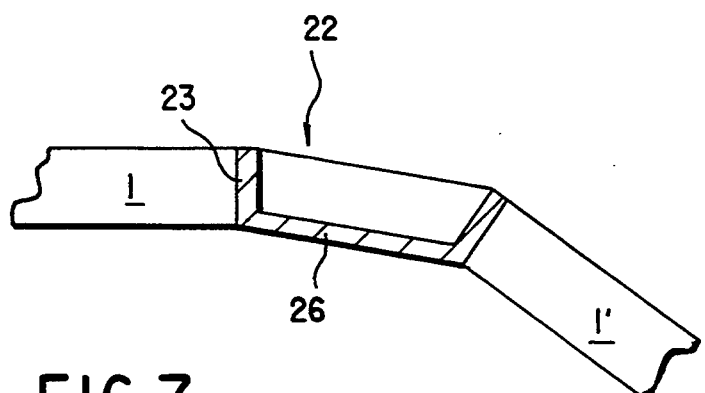
FIG. 7 is a fragmentary, sectional view of a further connecting element for connecting two components located in different planes.

FIG. 7 shows a further connecting element 22, that serves to join two components 1 and 1' for instance, which are disposed in planes that are inclined differently relative to one another, for instance for use in stabilizing roadway ditches. To that end, the connecting element 22 has lateral-surfaces 23 that extend obliquely away from a ground surface 26 and that are likewise provided with the coupling devices described above (and not shown for the sake of simplicity) for assuring a connection of adjacent components 1.

The variously constructed connecting elements 20 and 22 bring about an intimate meshing together of the components, which are also disposed in different planes or at different angles from one another and thus bring about a considerable increase in stability of the entire composite component structure. For instance, when the components are used for planting banks, the obliquely extending components of the bank planting can merge with components disposed at the base of each bank, through suitably constructed connecting elements. As a result, a certain positional stability of the entire composite component structure is also assured.

Furthermore, as is shown in FIG. 8, each hook part 8 has protrusions 24 being disposed on the inside of the crosswise extension 10 and extending toward the lateral surface 5. These protrusions 24 cooperate with a recess 25 disposed at the same position on the adjacent component 1, in such a way that locking is attained in terms of the height mobility of two adjacent components.

As FIG. 9 clearly shows, the recess 25 extends inward from the lateral edge of the outer frame 2 facing away from the duct 9 and ends approximately at the region of a protuberance 19, as is as clearly shown in FIG. 10.

In order to join a plurality of components to make a composite component structure, the adjacent component is thrust from the open side of the duct 9 with a certain exertion of force through its hook part and the protrusions 24 disposed on it. The protrusions 24 then engage the recess 25 on their front end and thereby effect the locking in terms of height mobility of two adjacent components, which can be unlocked again only if considerable force is exerted. This height locking is provided for each hook part and the corresponding recess on the component.

Figure 11:
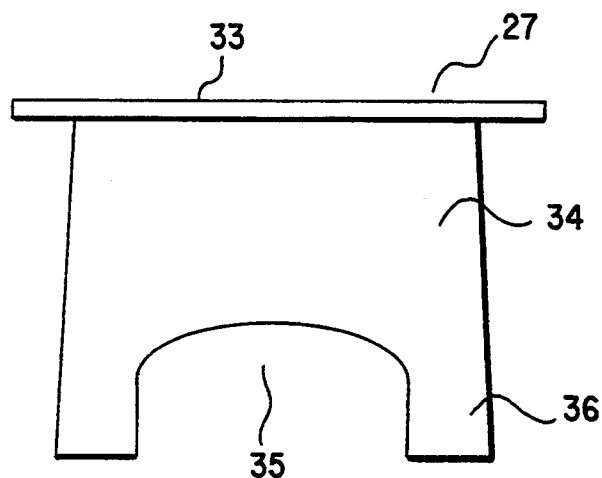
FIG. 11 is a view of a marking element for making a composite component structure.

FIG. 11 shows a marking element 27, which can be thrust from above into the applicable opening 6 of the component 1. In this way, parking lot markings or other markings can, for instance, be made on the composite component structure. The marking element 27 includes a plate-like upper part 33, which is joined to a lower extension 34. The extension has a conicity that widens slightly in the downward direction and has a total of four protrusions 36 which are formed by recesses 35 provided on the four sides. When the marking element 27 is inserted into the applicable opening or recess 6, the protrusions 36 seize firmly because of their spring action and the conicity of the lower extension 34 and assure a secure hold of the marking element 27 in the component. The marking element 27 is likewise made of plastic, by using recycled plastic material of the kind that is also used for producing the component 1. Suitably, the plastic is either white or is colored with a signalling color.

Figure 12:
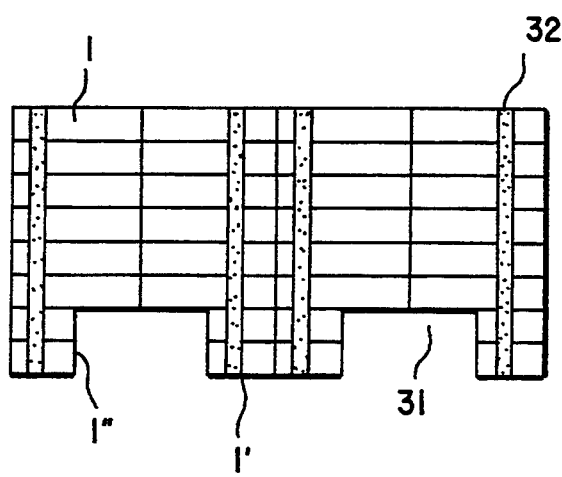
FIG. 12 is a plan view of a composite structure of individual components that can be transport by a forklift.

FIG. 12 shows a transportable composite structure of a plurality of individual components 1. The composite structure includes a plurality of layers which are stacked one on the other. The layers are formed of individually joined-together components 1 Further components 1', 1" are provided on the lower surface and have half the side length on either one or both sides, as compared with the component 1. In this connection, a decisive factor is that interstices 31 are created on the lower surface of the entire composite structure and can be engaged by a forklift or the like. This makes it unnecessary to use additional, conventional transport pallets. Joining together of the individual components in a vertical alignment is assured by means of a plurality of tightening straps 32, which may be disposed in such a way that in particular they also reach through the individual openings 6 of the components 1. As a result, immediately after being produced, the components 1 can be stored in a condition in which they are ready for transport. No additional parts are needed except for the various tightening straps 32.

According to the invention, in order to provide green grass or other vegetation on a surface, such as a parking lot, garage entryway, or other surface to be paved with the components, the components are first filled with soil, peat or the like, and then seeded. To that end, the components should be laid unidiminsionally in the composite structure and then, as soon as the vegetation has begun to grow and a certain stabilization of the soil located in the openings has taken place as a result of the roots of the vegetation, the components are put together into transportable stacks, transported in this way, and then laid out on site by connecting the previously planted components or composite component structures.

Figure 13:
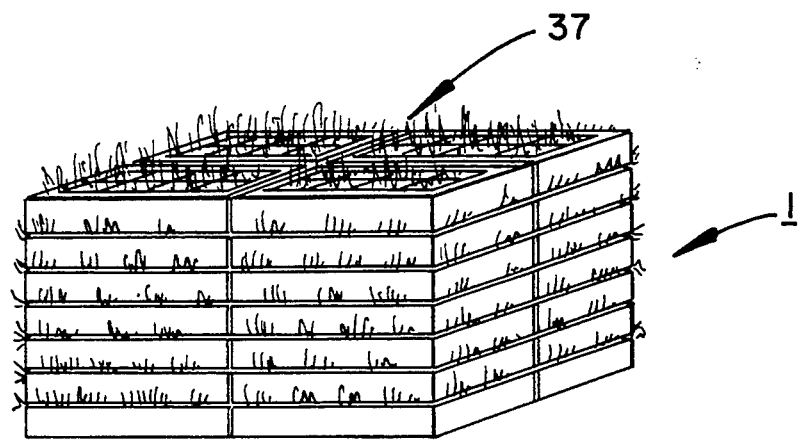
FIG. 13 is a perspective view of a stack of components with vegetation, that is prepared for being laid out.

FIG. 13 shows one such transportable stack of individually planted composite component structures. In this case, one composite component structure includes four joined-together components 1. Reference numeral 37 indicates the vegetation in the individual components, for example in the form of a lawn or the like. It does no harm if the planted composite component structures are briefly stacked on one another for transport.

Figure 14:
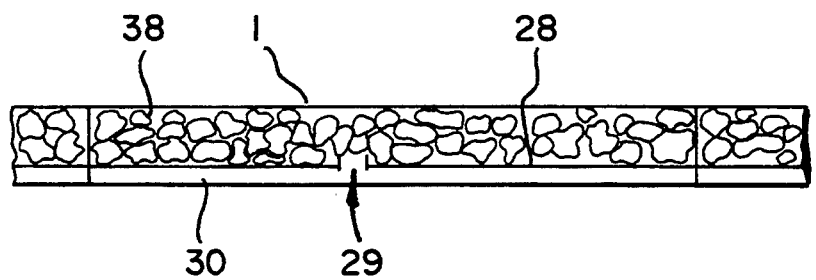
FIG. 14 is a fragmentary view of a component located in a composite structure, particularly for use as a roof covering to be filled with crushed stone or gravel.

FIG. 14 is a simplified diagrammatic view which shows a component 1 according to the invention, that has a continuous horizontal intermediate wall 28, by means of which a hollow space 30 is formed and which is intended, when the component is filled with gravel 38, to prevent the gravel from slipping between the lower bearing surfaces of the component 1 and the ground when a load is put on the component and thereby causing the composite component structure to lift up. In order to assure drainage of water, at least one drainage opening 29 may be provided in the intermediate wall 28. For the sake of simplicity, the individual crosswise members and lengthwise members of the component are not shown in FIGS. 13 and 14. The same is true for the hook parts for connecting the individual components.

A plastic made of previously comminuted and then melted-down plastic waste which can be injected or poured into a mold, is used as a material for the component or connecting elements, according to the invention. Typically, this is waste that above all includes granulated or ground polyethylene (low and high-pressure PE) or polypropylene that can no longer be blow-molded yet nevertheless is still injectable or pourable.

The plastic composition may also have some component of cardboard waste, which is suitable in order to perceptibly reduce the weight of the component according to the invention.

Figure 15:
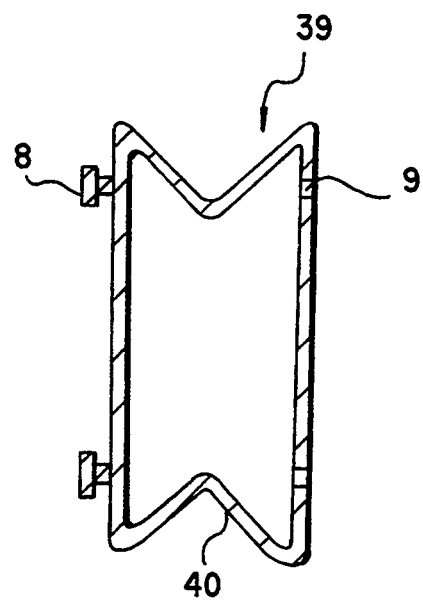
FIG. 15 is a top-plan view of an expansion joint element for the equalization of expansions of the building component composite structure caused by temperature.
Figure 16:
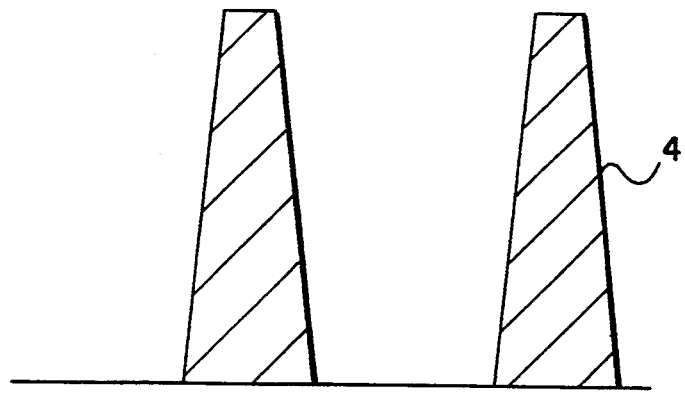
FIG. 16 is a simplified, diagrammatic, cross-sectional view of an illustration of two lengthwise members.

FIG. 15 shows an expansion joint element 39 which is integrated in the composite structure of individual building components through hook parts 8 of a known type. The expansion joint element 39 is comparatively small and has deformations 40 at the end surfaces, which cause the expansion joint element 39 to operate like a spring or a shock absorber during lateral compression. The expansion joint element 39 is advantageously produced in the same way as the building component 1 and has a duct 9 formed therein. The expansion joint element equalizes expansions of the building component configuration caused by temperature fluctuations, so that negative influences or drawbacks are decreased.

Expediently, a segment being formed of various expansion joint elements 39 which are disposed side by side is provided over the entire width of the building component configuration.

The crosswise members 3 and the lengthwise members 4 have a cross-section which extends from the base towards the-top with a taper. In this way, a problem-free filling of the building component structures with earth, sand or the like is ensured. Moreover, a lifting of the building component composite structure which is filled with earth, for example, because of unfavorable force proportions during loading in this development, can be avoided, which means no undesired lifting pressure exists during loading. Furthermore, the contact or support surfaces are enlarged, in comparison with known building component structures, and the building component composite structure can be filled more easily. The special shape of the crosswise members 3 as well as the lengthwise members 4 furthermore provides the advantage of pre-planted building component composite structures being easier to handle and the planting inside of the building component composite structure or the building component configuration not being able to fall through easily. The production of these special building components is carried out in such a way that the building component, in view of its total depth, is being produced in one half of a mold and that the other half of the mold only serves as the cover.

I claim:

1. In a generally flat composite structure having building blocks in the form of a plurality of multipurpose plastic building components, each of the building components comprising:
   an encompassing outer frame having a lateral surface and an interior;
   at least one coupling device disposed at said lateral surface for joining two adjacent building components;
   crosswise members and lengthwise members dividing the interior of said outer frame into a grid of individual openings; and
   said outer frame and said crosswise and lengthwise members being formed of plastic waste having been previously comminuted, then melted down and then injected or cast into a suitable mold; and said outer frame having outer surfaces including upper and lower surfaces, said coupling device including at least one T-shaped hook part integrally formed at a given position on one of said outer surfaces, and another of said outer surfaces opposite said one outer surface having a cutout formed therein at said given position being open toward one of said upper and lower surfaces for receiving said hook part, wherein said at least one hook part has a lower surface, and at least said lower surface is flush with said lower surface of said outer frame.

2. The component according to claim 1, wherein each of the building components has a main surface, and including formed-on projections projecting away from said main surface and being distributed sheetwise in the region of said main surface at intersections of said crosswise members, said lengthwise members and said outer frame.

3. The component according to claim 1, including formed-on projections disposed at intersections of said crosswise members, said lengthwise members and said outer frame.

4. The component according to claim 1, wherein said outer frame has upper and lower surfaces, and said crosswise members and lengthwise members are flush with said upper and lower surfaces.

5. The component according to claim 1, wherein said outer frame has outer surfaces including upper and lower surfaces, said coupling device includes at least one hook part disposed at a given position on one of said outer surfaces, and another of said outer surfaces opposite said one outer surface has a duct formed therein at said given position being open toward one of said upper and lower surfaces.

6. The component according to claim 1, including at least one formed-on projection disposed on said lower surface of said at least one hook part.

7. The component according to claim 1, wherein said outer frames of the components have back surfaces, said at least one hook part has a crosswise extension and a lengthwise extension, said lengthwise extension joins said crosswise extension to said outer frame, and when the components are coupled together, said lengthwise extension of one of the components extends through said duct of another of the components and said crosswise extension of the one component engages said back surface of said outer frame of the other component.

8. The component according to claim 1, including means for locking adjacent coupled-together components relative to height.

9. The component according to claim 8, wherein said height locking means include at least one protrusion engaging at least one recess formed in said outer frame when two adjacent components are coupled together, said protrusion is forced out of said recess when said locking means are released by a contrary displacement of the two adjacent components, and said protrusion and said recess are each disposed in the region of said coupling device of a respective one of said components.

10. The component according to claim 9, wherein said outer frame has a protuberance-formed thereon, said said recess is formed in or ends at the region of said protuberance.

11. The component according to claim 10, wherein said outer frame has lateral edges, and said recess extends from the outside inward from one of said lateral edges.

12. The component according to claim 1, wherein said outer frame has a lower surface with recesses extending in at least one of a transverse and a longitudinal direction in said lower surface.

13. The component according to claim 1, including crosswise protrusions being offset from one another with respect to their depth in at least one of said openings.

14. The component according to claim 1, including retaining means being molded in with said outer frame in at least one of said openings.

15. The component according to claim 1, wherein said outer frame has an outer surface, and including a covering disposed on said outer surface at least at one of said openings.

16. The component according to claim 2, including spacer sleeves to be slipped onto said formed-on projections.

17. The component according to claim 1, including a connecting element being wedge-shaped as seen in a plan view and having lateral surfaces, said at least one coupling device being disposed only on said lateral surfaces of said connecting element, and said lateral surfaces of said connecting element corresponding in length to said lateral surface of said outer frame.

18. The component according to claim 1, including a connecting element having two opposed obliquely extending lateral surfaces, and said lateral surfaces corresponding in length to said lateral surface of said outer frame.

19. The component according to claim 1, wherein the component has a given area, and including an intermediate wall extending transversely over the entire given area, said wall having means for defining a lower hollow space between said wall and a supporting surface on which the component stands, and said wall having at least one drainage opening formed therein.

20. The component according to claim 1, wherein the component has an upper surface, and including marking elements to be inserted into one of the openings for marking said upper surface.

21. The component according to claim 20, including means for fixing said marking element inside said opening by clamping.

22. The component according to claim 20, including a tongue and groove connection for fixing said marking element inside said opening.

23. The component according to claim 1, wherein said first-mentioned component has a given side length, and including further components being disposed next to said first-mentioned component and having sides, at least one of said sides of said further components having half said given length, a plurality of said components being joined together into the generally flat composite structure of a given size for transport, said composite structure having a lower surface on which said further components are disposed as bottom supports, and said components defining interstices to be engaged by a forklift or the like.

24. The component according to claim 23, including at least one tightening strap passing through said openings in said components for connecting the components together in the vertical direction.

25. The component according to claim 1, including a proportion of cardboard waste in a composition of said previously comminuted and then melted-down plastic waste.

26. The component according to claim 1, wherein the component is square and has the following dimensions:
total length=250-500 mm,
length of one opening=50-70 mm,
component depth=40-60 mm, and
thickness of said crosswise members and said lengthwise members=4-6 mm.

27. The component according to claim 1, including at least one expansion joint element (39) next to said building component (1), said coupling device having at least one hook part (8) formed on said outer frame (2) and ducts (9) formed in said outer frame (2), said at least one expansion joint element (39) being integrated in a composite of individual building components (1) through said at least one hook part (8) and said ducts (9), and said at least one expansion joint element (39) having a shape operating as a spring during lateral compression.

28. The component according to claim 1, wherein said crosswise members (3) and said lengthwise members (4) have bases, tops and diameters decreasing from said bases towards said tops.

* * * * *